3,111,324
O-RING STRUCTURE
Sumner D. Wiltse, 4943 Ridgewood Ave.,
Detroit 4, Mich.
Filed Oct. 26, 1960, Ser. No. 65,172
1 Claim. (Cl. 277—203)

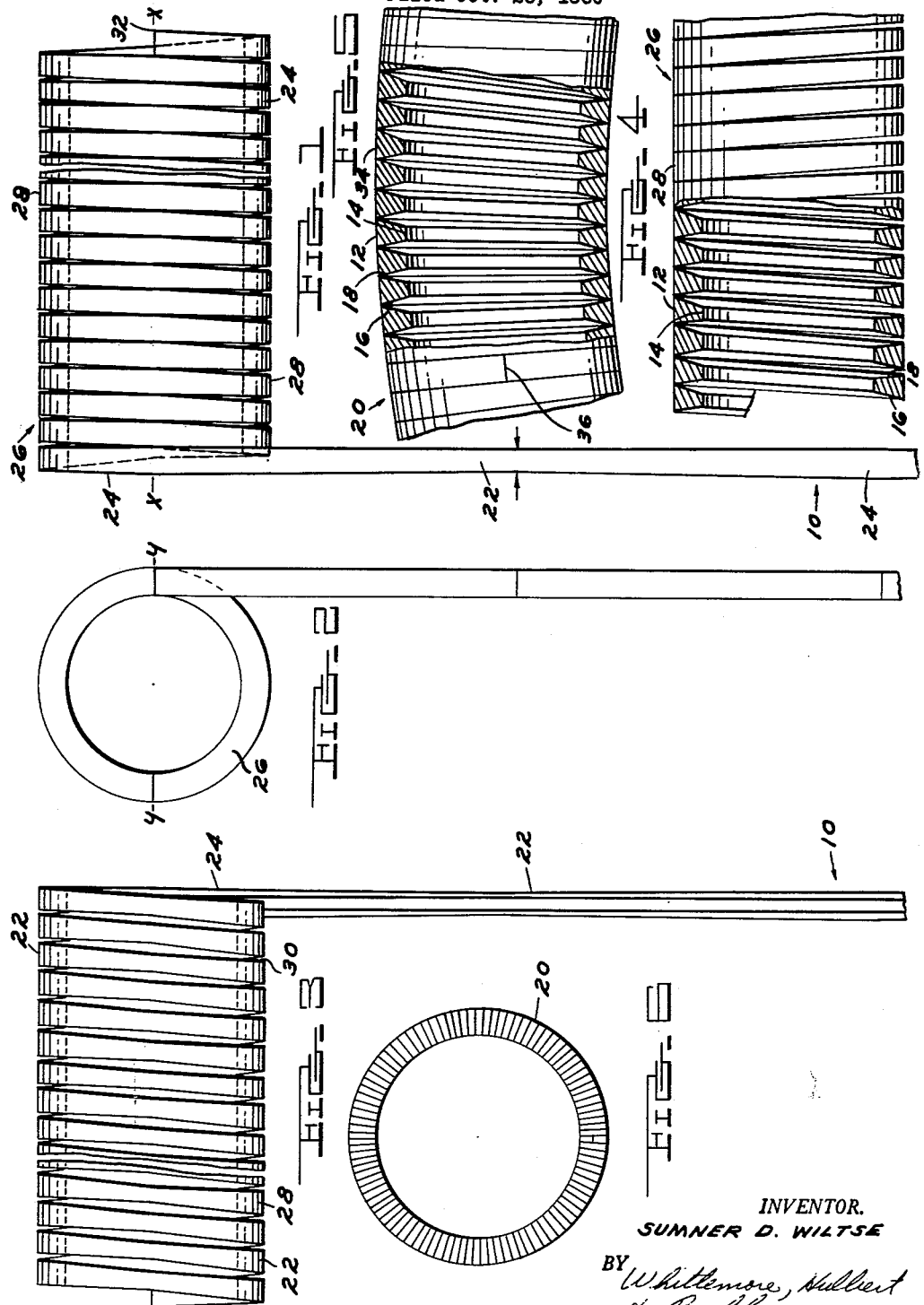

This invention relates generally to fluid-tight connections and refers more specifically to an improved elastic O-ring structure for forming a fluid-tight seal between a length of tubing or pipe and a fitting therefor.

One of the essential objects of the invention is to provide an elastic radially expansible and contractible, substantially non-compressible, circumferentially stretchable, shear resisting sealing O-ring of uniform circular radial cross section throughout its circumference capable of preventing leakage between the tubing and fitting and capable of holding the tubing against outward end thrust to prevent such tubing from being accidentally withdrawn or pressure blown from the fitting.

Another object is to provide an elastic O-ring of the type mentioned consisting of a single tubular annulus of uniform circular radial cross section throughout its circumference and having a circular center line disposed in a plane at substantially a right angle to the axis of the O-ring, the annulus aforesaid consisting of a single wire strand made from a high temperature, heat resisting metal or alloy, and having along the center line aforesaid interconnected helical substantially radially extending convolutions of uniform diameter having substantially flat exterior surfaces substantially concentric with said circular center line and having opposed peripheral side edges thereof normally arranged in tightly abutting closed leakproof relation with each other throughout the circumference of said annulus.

Another object is to provide an elastic O-ring wherein the annulus is formed from a single wire strand having a trapezoidal cross section throughout its length.

Another object is to provide an elastic O-ring wherein the exterior surfaces of said convolutions are substantially flush with each other and provide said O-ring with a continuous relatively smooth exterior surface throughout its circumference.

Another object is to provide an elastic O-ring wherein opposite ends of the single wire strand abut each other and are rigidly secured together to normally maintain the O-ring formation aforesaid.

Another object of the invention is to provide an elastic O-ring structure that is simple in construction, economical to manufacture and efficient in operation.

Other objects, advantages and novel details of construction of this invention will be made more apparent as this description proceeds, especially when considered in connection with the accompanying drawing, wherein:

FIGURE 1 is a top or plan view of the straight coiled formation formed from a straight strip of wire.

FIGURE 2 is a left hand end view of the straight coiled formation shown in FIGURE 1.

FIGURE 3 is a bottom view of the straight coiled formation, after being rotated 180 degrees.

FIGURE 4 is a side view of the straight coiled formation, after being rotated 90 degrees, with parts broken away and in section.

FIGURE 5 is a fragmentary vertical view of the O-ring, with parts broken away and in section, with the convolutions in abutting closed relation with each other.

FIGURE 6 is a reduced elevational view of the O-ring.

FIGURES 1–3 show part of an original relatively long and straight strip of wire designated by the numeral 10. The wire 10 has a substantially trapezoidal cross section and includes a pair of parallel sides 12 and 14 and a pair of non-parallel sides 16 and 18. The wire 10 is to be subsequently formed into an elastic radially expansible and contractible, substantially non-compressible, circumfeerntially stretchable, shear resisting sealing O-ring represented by the numeral 20, as shown in FIGURE 6. The O-ring 20 has a circular center line disposed in a plane at substantially a right angle to the centroidal axis of the O-ring 20.

The wire 10 is formed from a high temperature, heat resisting metal or alloy capable of withstanding extreme temperatures in the range between 2300 degrees F. and 2800 degrees F. It is to be appreciated, however, that the O-ring 20 can likewise be employed as a substitute for conventional plastic-type O-rings at much lower temperatures.

Initially, the relatively long and straight strip of wire 10 is compressed at longitudinally spaced points between rollers, not shown, to provide alternate compressed and non-compressed portions represented by the numerals 22 and 24 respectively. The wire 10 is coiled on a cylindrical mandrel, not shown, to provide a straight coiled formation 26. In this connection, the rollers for forming the compressed portions 22 may be actuated by any suitable means (not shown), either in phase with the actuating means for the mandrel or otherwise. The straight coiled formation 26 consists of a series of closely aligned helical convolutions 28, each of the convolutions 28 aforesaid consisting of a compressed portion 22 and a non-compressed portion 24. The compressed portions 22 are located at approximately 180 degrees apart in the straight coiled formation 26.

The adjacent sides of the convolutions 28 are tangent to each other at a point and diverge therefrom circumferentially in both directions 180 degrees. The various points of tangency lie along the line X—X in FIGURE 1. The space 30 between the adjacent sides of the convolutions 28 is of varying width which is symmetrical upon opposite sides of the principal plane Y—Y containing the line X—X so as to arrange the convolutions 28 in axially spaced-apart relation except at the points of tangency.

In actual practice, the narrow space 30 has a varying width in the range between .001 inch and .003 inch for the express purpose of permitting the convolutions 28 to be later formed into the annulus 34 with the convolutions 28 having continuous relatively smooth outer and inner surfaces throughout its circumference. The width of the space 30 has been exaggerated in the figures for illustration purposes only. In some instances, the space 30 may be so small as to be unnoticeable. Each end of the coiled formation 26 is provided with a substantially straight end or surface 32.

After the requisite length of coiled formation 26 has been completed, it is necessary to orient the coiled formation 26 for the subsequent bending operation. The compressed portions 22 are arranged radially closer to the bending axis, which is coincident with the centroidal axis of the resulting O-ring 20, than the non-compressed portions 24.

The oriented straight coiled formation 26 is then bent or curved into an annulus 34 in such a manner that the axially spaced compressed portions 22 and non-compressed portions 24 are moved into abutting or contacting surface to surface relation with each other as is shown in FIGURE 5 to close the narrow space 30 between the convolutions 28. After the formation of the annulus 34, the opposite ends 32 of the wire strand are secured together by a welding operation as indicated by the weld 36 in FIGURE 5 so as to maintain the ring formation, thereby holding the convolutions 28 in abutting closed relation with each other. This connection of the ends could be a but welding operation or a suitable splice as may be desired. At lower temperatures, the connection could be accomplished by a brazing operation.

The improved elastic O-ring structure as formed in the manner just described forms a fluid-tight seal between a length of tubing or pipe and the fittting. When the O-ring 20 is assembled between the opposed surfaces of the fitting and pipe, the convolutions 28 of the O-ring 20 provide an imperforate tubular annular formation to prevent leakage of the fluid between any of the convolutions 28.

The O-ring 20 can be used as a substitute for conventional elastomeric O-rings for low or high temperatures and pressures.

What I claim as my invention is:

An article of manufacture comprising an elastic radially expansible and contractible substantially non-compressible circumferentially stretchable shear-resisting sealing O-ring of uniform circular radial cross section throughout its circumference, said O-ring consisting of a single tubular annulus having a uniform circular radial cross section throughout its circumference, having a circular center line disposed in a plane at substantially a right angle to the axis of said O-ring, and consisting of a single strand of substantially trapezoidal cross section throughout its length, said single strand being compressed at longitudinally spaced points thereof throughout its length, said annulus having along the circular center line thereof interconnected helical substantially radially extending convolutions of uniform diameter having substantially flat exterior surfaces and having substantially flat interior surfaces, the substantially flat exterior surfaces and the substantially flat interior surfaces being substantially parallel to each other and being substantially concentric with said circular center line, said substantially flat exterior surfaces having opposed peripheral side edges thereof arranged in tightly abutting closed leakproof relation with each other throughout the circumference of said annulus, said substantially flat exterior surfaces of said convolutions being substantially flush with each other and providing said O-ring with a continuous relatively smooth exterior surface throughout its circumference, opposite sides of said convolutions tapering inwardly from said exterior surfaces to said interior surfaces whereby opposed sides of said convolutions provide inwardly diverging openings and the substantially flat interior surfaces are spaced laterally apart, opposite ends of said single strand abutting each other and being rigidly secured together to normally maintain the O-ring formation aforesaid.

References Cited in the file of this patent

UNITED STATES PATENTS

| | | |
|---|---|---|
| 522,459 | Ellis | July 3, 1894 |
| 792,514 | Gill | June 13, 1905 |
| 917,770 | Knudsen | Apr. 13, 1909 |
| 972,928 | Schneider | Oct. 18, 1910 |
| 1,004,658 | Keller | Oct. 8, 1911 |
| 1,377,266 | Mossberg | May 10, 1921 |
| 1,522,374 | Komori | Jan. 6, 1925 |
| 3,011,775 | MacLeod | Dec. 5, 1961 |

FOREIGN PATENTS

| | | |
|---|---|---|
| 278,408 | Germany | Sept. 28, 1914 |